(12) United States Patent
DeLeon

(10) Patent No.: US 11,095,047 B2
(45) Date of Patent: Aug. 17, 2021

(54) MULTIPLE WIDEBAND OR BROADBAND ANTENNAS

(71) Applicant: Arthur Ray DeLeon, Fredericksburg, VA (US)

(72) Inventor: Arthur Ray DeLeon, Fredericksburg, VA (US)

(\*) Notice: Subject to any disclaimer, the term of this patent is extended or adjusted under 35 U.S.C. 154(b) by 334 days.

(21) Appl. No.: 16/501,460

(22) Filed: Apr. 29, 2017

(65) Prior Publication Data
US 2020/0169008 A1 May 28, 2020

Related U.S. Application Data

(60) Provisional application No. 62/391,524, filed on May 26, 2016.

(51) Int. Cl.
| | |
|---|---|
| *H01Q 21/30* | (2006.01) |
| *H01Q 9/42* | (2006.01) |
| *H04B 3/52* | (2006.01) |
| *H01Q 1/24* | (2006.01) |
| *H04W 72/04* | (2009.01) |
| *H04B 1/69* | (2011.01) |

(52) U.S. Cl.
CPC ............ *H01Q 21/30* (2013.01); *H01Q 1/246* (2013.01); *H01Q 9/42* (2013.01); *H04B 1/69* (2013.01); *H04B 3/52* (2013.01); *H04W 72/0453* (2013.01)

(58) Field of Classification Search
CPC .......... H01Q 21/30; H01Q 1/246; H01Q 9/42; H01Q 25/00; H04W 72/0453; H04B 1/69; H04B 3/52; H04B 1/713
See application file for complete search history.

(56) References Cited

U.S. PATENT DOCUMENTS

| | | | | |
|---|---|---|---|---|
| 5,552,920 A | * | 9/1996 | Glynn | H04B 7/18504 |
| | | | | 342/352 |
| 6,055,268 A | * | 4/2000 | Timm | H04L 5/1438 |
| | | | | 375/229 |
| 2008/0259826 A1 | * | 10/2008 | Struhsaker | H04W 72/042 |
| | | | | 370/280 |
| 2012/0176237 A1 | * | 7/2012 | Tabe | F41H 3/02 |
| | | | | 340/539.12 |

\* cited by examiner

*Primary Examiner* — Michael C Zarroli
(74) *Attorney, Agent, or Firm* — Dale J. Ream

(57) ABSTRACT

A multiple wideband antenna or broadband antenna includes using the concepts of cellular clusters integrated into a dual polarity antenna panel. These panels integrate a free space optic capability to transmit and receive high-bandwidth communications and provide an option for improved communication transport of information from the base of the tower to the antenna minimizing the number of cables required to support the antenna. This antenna's also will integrate the capability to provide command and control using the cellular guard bands created between each cellular block to support Unmanned Aerial Systems or free space optics connection. This antenna will provide several methods of employment, including military operations, commercial cellular operations, unmanned systems communication requirements, the Internet of Things, and the future of autonomous vehicles or robotics.

7 Claims, 4 Drawing Sheets

| | A1 | B1 | C1 | D1 | E1 | F1 | G1 | A2 | B2 | C2 | D2 | E2 | F2 | G2 | A3 | B3 | C3 | D3 | E3 | F3 | G3 |
|---|---|---|---|---|---|---|---|---|---|---|---|---|---|---|---|---|---|---|---|---|---|
| | 1710 | 1715 | 1720 | 1725 | 1730 | 1735 | 1740 | 1745 | 1750 | 1755 | 1760 | 1765 | 1770 | 1775 | 1780 | 1785 | 1790 | 1795 | 1800 | 1805 | 1810 |
| DUPLEX PAIRING | 2110 | 2115 | 2120 | 2125 | 2130 | 2135 | 2140 | 2145 | 2150 | 2155 | 2160 | 2165 | 2170 | 2175 | 2180 | 2185 | 2190 | 2195 | 2200 | 2205 | 2210 |

| | 1 | 2 | 3 | 4 | 5 | 6 | 7 |
|---|---|---|---|---|---|---|---|
| | 1710 | 1715 | 1720 | 1725 | 1730 | 1735 | 1740 |
| DUPLEX PAIRING | 2110 | 2115 | 2120 | 2125 | 2130 | 2135 | 2140 |

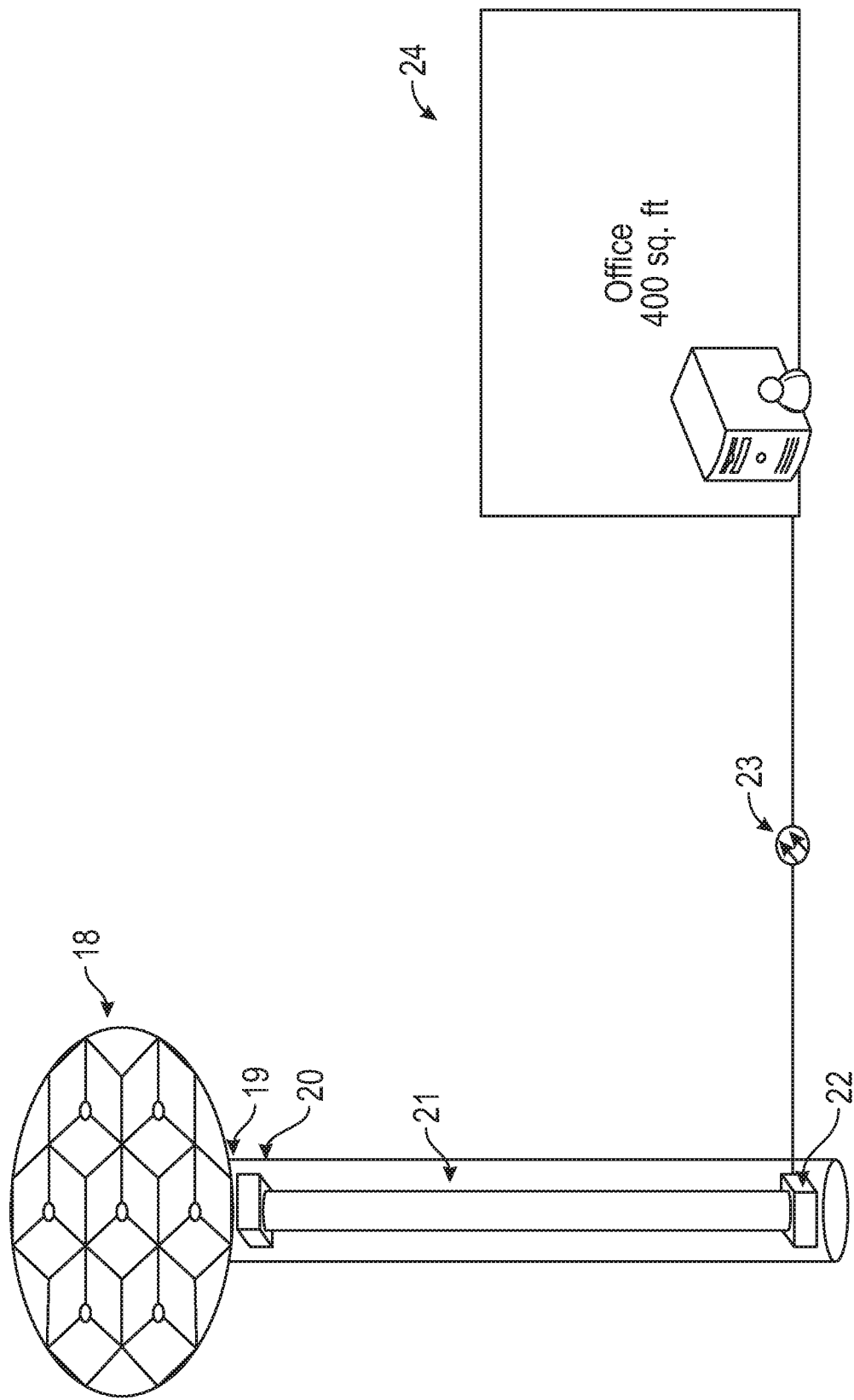

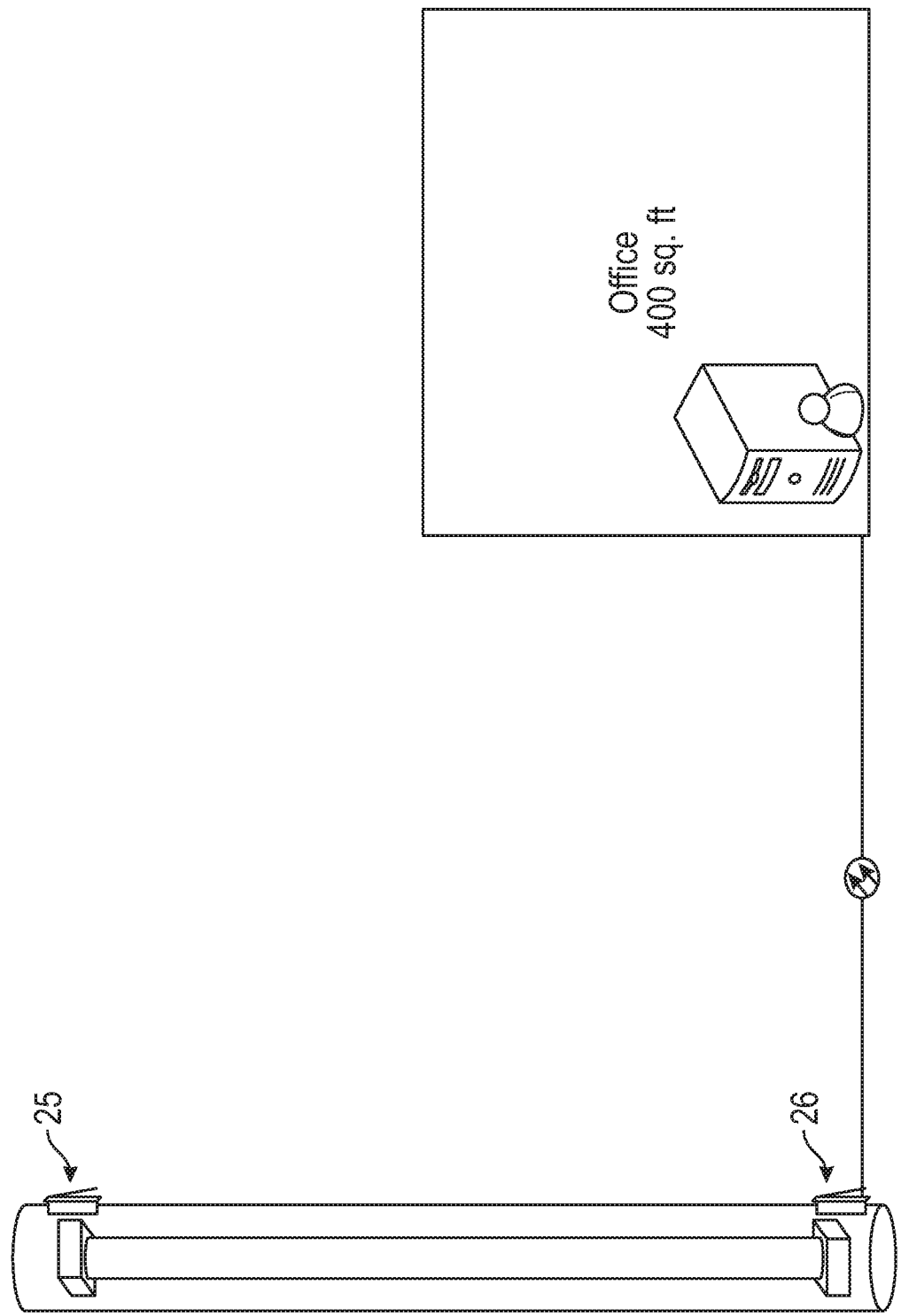

MULTIPLE WIDEBAND OR BROADBAND ANTENNAS

REFERENCE TO RELATED APPLICATIONS

This application claims the benefit of Application Ser. No. 62/391,524, filed May 3, 2016, and titled Multiple Wideband or Broadband Antennas, which is incorporated in its entirety herein.

BACKGROUND OF INVENTION

This invention relates to the antenna design uses of cellular layout with frequency reuse schemes to integrate multiple wideband capable panel antennas to connect and allow commercial or military communications to operate over multiple bands seamlessly. Integrating optical receive capabilities into the antenna in the future will allow for the exchange of high-bandwidth capabilities. The concepts are based upon the application of cellular networks, and the typical cellular grid design applied to the antenna with integrated frequency reuse capabilities. The concepts are based on cell clusters and the mathematical equation typically designed for frequency reuse to eliminate the carrier to co-channel interference. Integrated software for the antennas will allow and recommend the optimal pointing of the antenna based on the latitude and longitude of the antenna placement. Frequency planning and co-site interference was the leading element in this antenna design and to make more efficient use of the spectrum resource. Additionally, the antenna design integrates the concepts of sectoring typically built into the hexagon designs of planning cellular towers to increase the number of available channels to a communication system.

SUMMARY OF THE INVENTION

The following provides examples of how the invention is applicable to various scenarios and able to meet the mission requirements. One example is to use the invention combining with cellular technology within military communications systems to provide the ability for the U.S. military to build a highly robust architecture integrating security and agility into their networks. Military communications systems must be designed to meet today's and future global spectrum requirements, and they must have integrated security and frequency band hopping capabilities like cell phones today.

The integrated security and frequency band hoping capabilities will be applied to unmanned aerial systems in addition to using the cellular block guard bands to communicate. This will allow the elimination unused bandwidth without interfering with other communication capabilities.

The antenna is the key factor to providing a capable multi-band system able to support military operations. Integrating the concepts used in today's cellular spectrum re-use design provides the ability to expand military utility significantly. The use of cell layout schemes will allow multiple wide-band capable panel antennas to connect and allow military communications to operate over multiple bands seamlessly. Integrating optical receive/transmit capabilities into the antenna in the future will allow UAS download of imagery and several other key capabilities used by the military.

The antenna will also integrate the ability to transmit and receive communications from satellite communication from the free space optic's component or the radio frequency component of a satellite footprint, which will allow for seamless transition of communication systems from unmanned systems, robotics, and unmanned systems for command and control or surrogate satellite capabilities.

Additionally, the use of a multi-band antenna will provide methods to share a finite frequency resource among many commercial, federal government, and military communication capabilities minimizing spectrum at rest, based on the hundred-year history of discrete frequency assignments.

BRIEF DESCRIPTION OF THE DRAWING

Several elements of the antenna are not displayed including the many deployment methods like jersey walls along highways, different patterns besides the sphere shown in the graphic, future integrated asphalt communications to vehicles, and is realized when a complete enterprise system is used based on the various views and wherein:

FIG. 5 is a graphic depiction of the free space optics as an alternative of running cables and can be installed internal or externally to the tower.

FIG. 6 is a graphic depiction of the internal free space optics internal to the tower and the access panels to conduct maintenance, troubleshoot, or configure antenna panels.

DESCRIPTION OF THE PREFERRED EMBODIMENT

Figure 1:
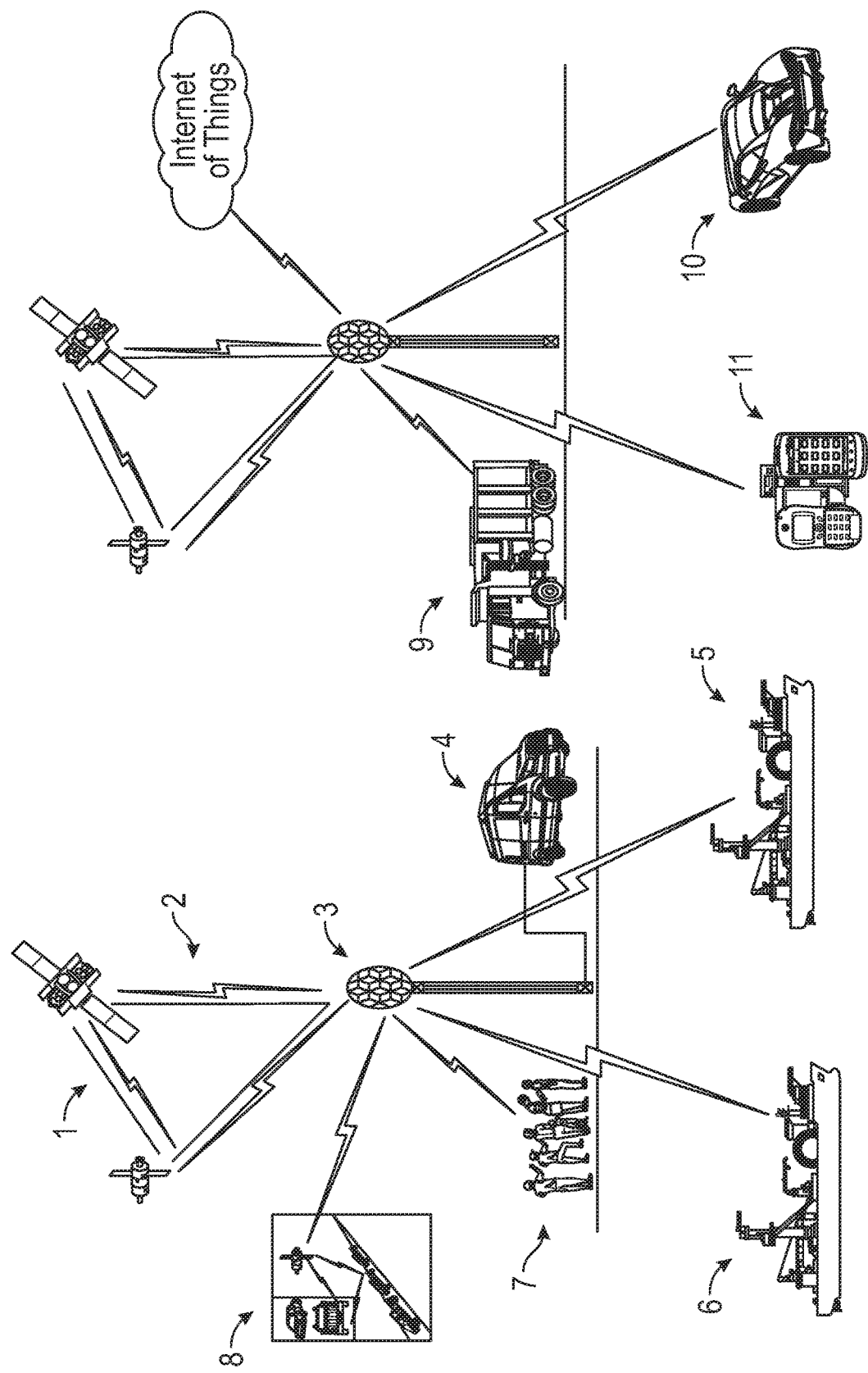
FIG. 1 is a graphic depiction of the methods of employment and use of the antenna. The left side provides military employment methods, and the left is commercial.

FIG. 1 illustrates a method to envision the methods of deployment, and the similar views outlined in FIGS. 1 through 6 that illustrate the antenna's frequency reuse components, multiple wide-band, broadband, and free space optic's capabilities. Reference numeral 1 illustrates the ability to integrate free space optics and reference numeral 2 illustrates radio frequency components of the architecture. Reference numeral 3 provides a tactical method of employment scaling the size of antenna panels based on the need, and tactical free space optics will provide rapid based station connections. Reference numeral 4 applies the mobile configuration and fiber optic or cable connections. Reference numeral 5 illustrates the ability to use the ships super structure to strategically place antenna panels, and reference numeral 6 provide a method to add scalable spear or three-dimensional shape that will provide a 360 degree panel with the ability to deploy scalable antenna capabilities. Reference numeral 7 establishes a scalable capability that allows tactical ground force the freedom of movement with secure cellular like capabilities. Reference numeral 8 integrates ground communication unmanned system swarming, Explosive Ordinance Disposal robotics into the configuration. There are several commercial applications that are illustrated in the view and antenna provides secure communication to delivery robotics as shown at reference numeral 9, autonomous vehicle communications 10, and cellular devices 11.

Figures 2, 3, 4:
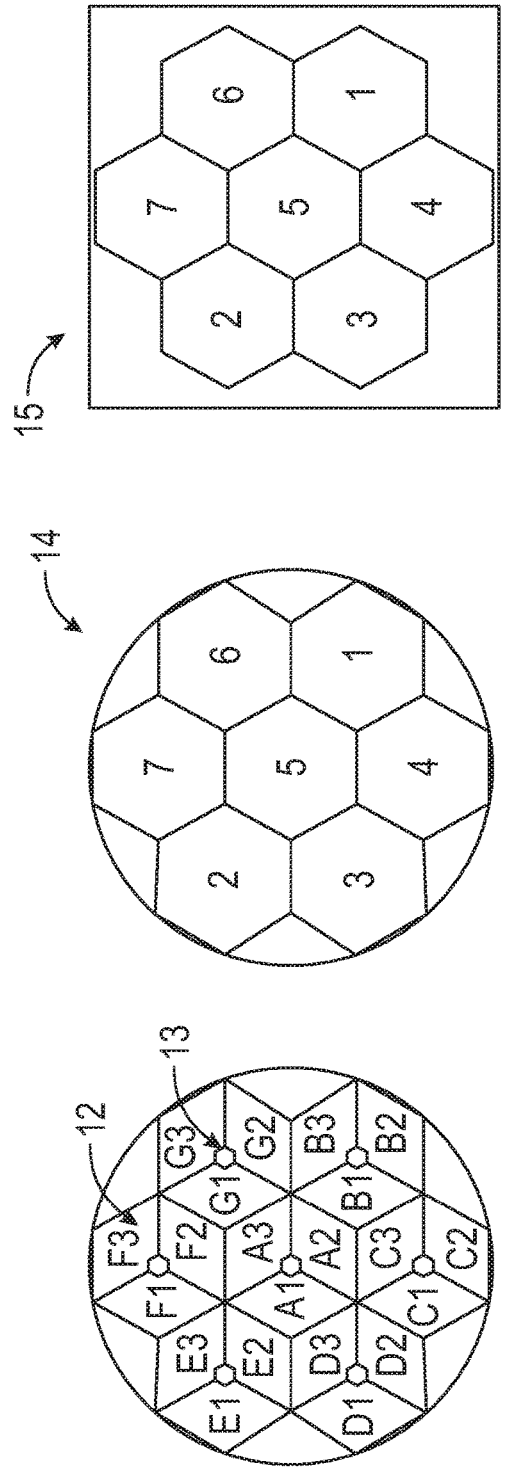
FIG. 2 is a graphic representation of how the antenna will use cellular clusters to integrate multiple wide-band antennas exploiting frequency reuse and provides integrated free space optics transmit and receive capabilities.
FIG. 3 is a table provided to represent how frequencies would be distributed on the antenna.
FIG. 4 is a table provided to represent how frequencies would be distributed on the antenna as a cluster of seven without the integrated optical component. As described in many telecommunication readings cluster can be applied in several different sizes.

FIG. 2 illustrates a graphic of the cluster concepts 12 integrated into antenna panels and frequency reuse components to increase current bandwidths. Reference numeral 13 illustrates integrating the ability to add free space optics into each hexagon cellular panel for gigabit or larger bandwidths. Reference numeral 14 illustrates a seven cluster system into a sphere or a 15 seven cluster capability into a highway jersey wall or home highway dividing walls.

With regard to FIG. 3-4, reference numeral 16 illustrates the distribution of duplex pairing frequencies in 5 MHz steps. Reference numeral 17 provides a duplex pairing frequency assignment's layout for a seven cluster system.

With regard to FIG. 5-6, the tower illustrates spheres 18 as a method of employment, however, can be applied to several three dimensional shapes and use software to rotate for fine-tuning the antenna panels based on software assist. The length of the tower illustrates the integration of the free space optics 20, 21, 22 internally to the tower and can also be deployed externally to the tower eliminating the overuse of cabling. The fiber optic cable 23 provides the connection to communications racks or base stations located inside communication building 24. Access panels 25, 26 are needed to ensure maintenance, configuration, and required repairs can be made to the optics.

I claim:

1. A multiple wideband or broadband antenna, comprising:
   a cellular grid design, clusters, and sectored frequency planning that is distributed along a plurality of cell towers and includes broadband cellular telephony using multiple frequency bands based on 5 MHz, 10 MHz, or 20 MHz blocks; and
   an Unmanned Aerial System configured to use cellular frequency block guard bands without causing interference and eliminating unused frequencies, each said unmanned aerial system configured to frequency hop through each guard band for efficiencies and to integrate command and control with data into a same signal.

2. The multiple wideband or broadband antenna as in claim 1 comprising free space optics for high band-width communication requirements.

3. The multiple wideband or broadband antenna as in claim 1, further comprising integrated security and frequency band hopping members operable to meet current and future global communication requirements making the most effective use of spectrum resources and frequency re-use.

4. The multiple wideband or broadband antenna as in claim 1 wherein a satellite's radio frequency footprints or free space optics exchange data.

5. The multiple wideband or broadband antenna as in claim 1 that uses multiple waveforms including 4G/5G cellular bandwidth for command and control, imagery, and data communications.

6. The multiple wideband or broadband antenna as in claim 5, further comprising software that ensures the cellular frequencies do not interfere with an adjacent towers or co-site antennas.

7. The multiple wideband or broadband antenna as in claim 1 that provides bandwidth requirements for future integration of autonomous vehicles, robotics, internet of things, and military unmanned swarming capabilities.

\* \* \* \* \*